(12) United States Patent
Lee et al.

(10) Patent No.: US 9,320,103 B2
(45) Date of Patent: Apr. 19, 2016

(54) LIGHT-EMITTING DIODE (LED) DRIVER, LED LIGHTING APPARATUS, AND METHOD OF OPERATING LED LIGHTING APPARATUS

(71) Applicant: SAMSUNG ELECTRONICS CO., LTD., Suwon-si (KR)

(72) Inventors: Bong-jin Lee, Hwaseong-si (KR); Hyun-jung Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/604,040

(22) Filed: Jan. 23, 2015

(65) Prior Publication Data

US 2015/0257230 A1    Sep. 10, 2015

(30) Foreign Application Priority Data

Mar. 6, 2014 (KR) .................. 10-2014-0026815

(51) Int. Cl.
*H05B 33/08* (2006.01)

(52) U.S. Cl.
CPC ........ *H05B 33/0851* (2013.01); *H05B 33/0812* (2013.01); *H05B 33/0815* (2013.01); *H05B 33/0827* (2013.01)

(58) Field of Classification Search
USPC ............... 315/247, 224, 185 S, 291, 307–326
See application file for complete search history.

(56) References Cited

U.S. PATENT DOCUMENTS

| | | | |
|---|---|---|---|
| 6,372,608 B1 | 4/2002 | Shimoda et al. | |
| 6,645,830 B2 | 11/2003 | Shimoda et al. | |
| RE38,466 E | 3/2004 | Inoue et al. | |
| 6,818,465 B2 | 11/2004 | Biwa et al. | |
| 6,818,530 B2 | 11/2004 | Shimoda et al. | |
| 6,858,081 B2 | 2/2005 | Biwa et al. | |
| 6,967,353 B2 | 11/2005 | Suzuki et al. | |
| 7,002,182 B2 | 2/2006 | Okuyama et al. | |
| 7,084,420 B2 | 8/2006 | Kim et al. | |
| 7,087,932 B2 | 8/2006 | Okuyama et al. | |
| 7,154,124 B2 | 12/2006 | Han et al. | |
| 7,208,725 B2 | 4/2007 | Sherrer et al. | |
| 7,288,758 B2 | 10/2007 | Sherrer et al. | |
| 7,319,044 B2 | 1/2008 | Han et al. | |
| 7,439,945 B1 | 10/2008 | Awalt et al. | |
| 7,501,656 B2 | 3/2009 | Han et al. | |
| 7,709,857 B2 | 5/2010 | Kim et al. | |
| 7,759,140 B2 | 7/2010 | Lee et al. | |

(Continued)

FOREIGN PATENT DOCUMENTS

| EP | 1889519 B1 | 3/2009 |
|---|---|---|
| WO | 2006/126172 A2 | 11/2006 |

*Primary Examiner* — Tuyet Vo

(74) *Attorney, Agent, or Firm* — Sughrue Mion, PLLC

(57) ABSTRACT

A light-emitting diode (LED) driver, an LED lighting apparatus, and a method of operating the LED lighting apparatus are provided. The LED driver may include an LED current controller configured to control an LED current, which flows through an LED array including a plurality of LEDs, such that the LED current is maintained at a constant level; a comparer configured to compare a sensing signal, which corresponds to a magnitude of the LED current, and a reference signal, and to obtain a first output signal based on a comparison result; and a dimming controller configured to modify the first output signal to obtain a second output signal for dimming of the plurality of LEDs, and to provide the second output signal to the LED current controller.

17 Claims, 13 Drawing Sheets

(56) References Cited

U.S. PATENT DOCUMENTS

| | | |
|---|---|---|
| 7,781,727 B2 | 8/2010 | Sherrer et al. |
| 7,790,482 B2 | 9/2010 | Han et al. |
| 7,919,928 B2 | 4/2011 | Ziegenfuss |
| 7,940,350 B2 | 5/2011 | Jeong |
| 7,959,312 B2 | 6/2011 | Yoo et al. |
| 7,964,881 B2 | 6/2011 | Choi et al. |
| 7,985,976 B2 | 7/2011 | Choi et al. |
| 7,994,525 B2 | 8/2011 | Lee et al. |
| 8,008,683 B2 | 8/2011 | Choi et al. |
| 8,013,352 B2 | 9/2011 | Lee et al. |
| 8,049,161 B2 | 11/2011 | Sherrer et al. |
| 8,111,014 B2 | 2/2012 | Van Erp et al. |
| 8,120,273 B2 | 2/2012 | Edwards |
| 8,125,159 B2 | 2/2012 | Aiello |
| 8,129,711 B2 | 3/2012 | Kang et al. |
| 8,144,111 B2 | 3/2012 | Kim et al. |
| 8,148,919 B2 | 4/2012 | Liu et al. |
| 8,169,159 B2 * | 5/2012 | Lu et al. .................. 315/307 |
| 8,179,938 B2 | 5/2012 | Kim |
| 8,217,592 B2 | 7/2012 | Yu et al. |
| 8,263,987 B2 | 9/2012 | Choi et al. |
| 8,324,646 B2 | 12/2012 | Lee et al. |
| 8,399,944 B2 | 3/2013 | Kwak et al. |
| 8,427,081 B2 | 4/2013 | Hsu et al. |
| 8,432,511 B2 | 4/2013 | Jeong |
| 8,459,832 B2 | 6/2013 | Kim |
| 8,502,242 B2 | 8/2013 | Kim |
| 8,513,895 B2 | 8/2013 | Yang et al. |
| 8,536,604 B2 | 9/2013 | Kwak et al. |
| 8,735,931 B2 | 5/2014 | Han et al. |
| 8,766,295 B2 | 7/2014 | Kim |
| 9,018,851 B1 * | 4/2015 | Melanson et al. .......... 315/247 |
| 2008/0130288 A1 * | 6/2008 | Catalano et al. .......... 362/294 |
| 2010/0201282 A1 | 8/2010 | Yu et al. |
| 2012/0126713 A1 | 5/2012 | Horino |
| 2012/0194079 A1 | 8/2012 | Clauberg et al. |
| 2013/0134894 A1 * | 5/2013 | Kuang .................. 315/224 |

* cited by examiner

LIGHT-EMITTING DIODE (LED) DRIVER, LED LIGHTING APPARATUS, AND METHOD OF OPERATING LED LIGHTING APPARATUS

CROSS-REFERENCE TO RELATED APPLICATION

This application claims priority from Korean Patent Application No. 10-2014-0026815, filed on Mar. 6, 2014 in the Korean Intellectual Property Office, the disclosure of which is incorporated herein in its entirety by reference.

BACKGROUND

Apparatuses and methods consistent with exemplary embodiments relate to a light-emitting diode (LED), and more particularly, to an LED driver, an LED lighting apparatus, and a method of operating the LED lighting apparatus.

In daily life, fluorescent lamps and incandescent lamps using an alternating current (AC) power source are generally used. In particular, fluorescent lamps are frequently used because of their power-efficiency and improved luminance. Lighting apparatuses may be provided in any location where a power source is provided and installation is convenient. As the demand for the lighting apparatuses increases and the lighting apparatuses are applied to a greater variety of fields, power load is also increased gradually due to power consumed by the lighting apparatuses. Therefore, much effort has been expended to reduce power consumption.

An LED is a semiconductor device configured to emit light when a predetermined current is applied thereto. As vacuum tubes have evolved into transistors and large scale integration (LSI) devices, lighting apparatuses are expected to rapidly evolve from incandescent lamps (i.e., a second generation light source) and fluorescent lamps (i.e., a third generation light source) to LEDs (i.e., a fourth generation light source), which are a semiconductor light source. Also, LEDs are eco-friendly because they have a longer lifespan than other light sources, highly efficient, small, light-weight, and do not use mercury. Therefore, LEDs are quickly replacing other light sources.

SUMMARY

Aspects of exemplary embodiments overcome a problem of a light-emitting diode (LED) driver in the related art that has difficulty in accurately controlling dimming of an LED. In order to control the dimming, a related art LED driver may compare a detection voltage corresponding to an LED current and a reference voltage, and change the LED current by changing a resistance value of an input terminal of an error amplifier that functions as an amplifying comparative unit or adjusting the reference voltage. In this case, an offset voltage in an error amplifier is reflected in an output voltage of the error amplifier and causes difficulty in accurately controlling the dimming.

According to an aspect of an exemplary embodiment, there is provided a light-emitting diode (LED) driver that includes: an LED current controller configured to control an LED current, which flows through an LED array that includes a plurality of LEDs, such that the LED current is maintained at a constant level; a comparer configured to compare a sensing signal, which corresponds to a magnitude of the LED current, and a reference signal, and to obtain a first output signal based on a result of the comparison; and a dimming controller configured to modify the first output signal to obtain a second output signal for dimming of the plurality of LEDs, and to provide the second output signal to the LED current controller.

The LED current controller may include: a converter configured to output a controlled LED current and includes a switch; and a converter controller configured to controls an operation of the switch according to a level of the second output signal.

The LED current controller may include a pulse width modulation (PWM) signal generator configured to generate a PWM signal based on the second output signal; a converter configured to output a controlled LED current and including a switch; and a converter controller configured to control an operation of the switch according to a duty ratio of the PWM signal.

The dimming controller may include a voltage level limiter that is connected to the comparer and is configured to limit a voltage level of the first output signal, and the dimming controller may be configured to obtain the second output signal based on the first output signal limited by the voltage level limiter.

The comparer may include an operational amplifier that includes an inverting input terminal configured to receive the sensing signal and a non-inverting input terminal configured to receive the reference signal. The operational amplifier may amplify a difference between the sensing signal and the reference signal and output the amplified difference as the first output signal.

The voltage level limiter may be connected to a power supply terminal of the operational amplifier, and may be configured to provide a variable power source to the operational amplifier.

The voltage level limiter may include a first resistor unit in which at least two first resistors are connected in parallel, and a second resistor unit in which at least two second resistors are connected in parallel. A first voltage power source may be connected to at least one of the first resistor unit and the second resistor unit. The voltage level limiter may be configured to generate a second voltage from a first voltage provided by the first voltage power source based on a ratio between a total resistance of the first resistor unit and a total resistance of the second resistor unit, and may provide the second voltage as a supply voltage to the operational amplifier.

The voltage level limiter may further include at least one switch in at least one of the first resistor unit and the second resistor unit so as to change the ratio between the total resistance of the first resistor unit and the total resistance of the second resistor unit. The dimming controller may further include a switch controller that turns on/off the at least one switch.

The dimming controller may include a voltage divider that is connected to an output terminal of the comparer, and is configured to divide the first output signal to obtain the second output signal.

The voltage divider may include a first resistor unit in which at least two first resistors are connected in parallel, and a second resistor unit in which at least two resistors are connected in parallel. The dimming controller may further include a voltage limiter configured to obtain a second output signal from the first output signal based on a ratio between a total resistance of the first resistor unit and a total resistance of the second resistor unit, and may provide the second output signal to the LED current controller.

The voltage divider may further include at least one switch in at least one of the first resistor unit and the second resistor unit so as to change the ratio between the total resistance of the first resistor unit and the total resistance of the second resistor unit. The dimming controller may further include a switch controller that turns on/off the at least one switch.

An isolated component that transfers a control signal that is output from the dimming controller to the LED current controller may further be included.

According to an aspect of another exemplary embodiment, there is provided an LED dimming apparatus that includes: an LED array including a plurality of LEDs that are connected; an LED current controller configured to control an LED current, which flows through the LED array, such that the LED current is maintained at a constant level; a comparer configured to compare a sensing signal, which corresponds to a magnitude of the LED current, and a reference signal, and to obtain a first output signal based on a result of the comparison; and a dimming controller configured to modify the first output signal to obtain a second output signal for controlling a dimming of the plurality of LEDs, and to provide the second output signal to the LED current controller.

The dimming controller may include a voltage level limiter that is connected to the comparer and is configured to limit a voltage level of the first output signal, and the dimming controller may be configured to obtain the second output signal generated based on the first output signal limited by the voltage level limiter.

The dimming controller may include a voltage divider that is connected to an output terminal of the comparer, and the voltage divider may divide the first output signal to obtain the second output signal.

According to an aspect of another exemplary embodiment, there is provided a method of controlling current provided to an LED array comprising a plurality of LEDs, the method including: comparing a sensing signal, which corresponds to a magnitude of an LED current flowing through the LED array, and a reference signal; obtaining a first output signal based on the comparing; and modifying the obtained first output signal to obtain a second output signal for controlling a dimming of the plurality of LEDs such that the LED current is maintained at a constant level.

The method may further include outputting a controlled LED current that is maintained at a constant level according to a level of the obtained second output signal.

The method may further include: generating a PWM signal based on the obtained second output signal; and outputting a controlled LED current according to a duty ratio of the PWM signal.

The modifying the obtained first output signal may include: limiting a voltage level of the obtained first output signal; and obtaining the second output signal based on the first output signal limited by the limiting.

The modifying the obtained first output signal may include dividing the first output signal to thereby obtain the second output signal.

BRIEF DESCRIPTION OF THE DRAWINGS

Exemplary embodiments will be more clearly understood from the following detailed description taken in conjunction with the accompanying drawings in which.

DETAILED DESCRIPTION OF EXEMPLARY EMBODIMENTS

Figure 1:
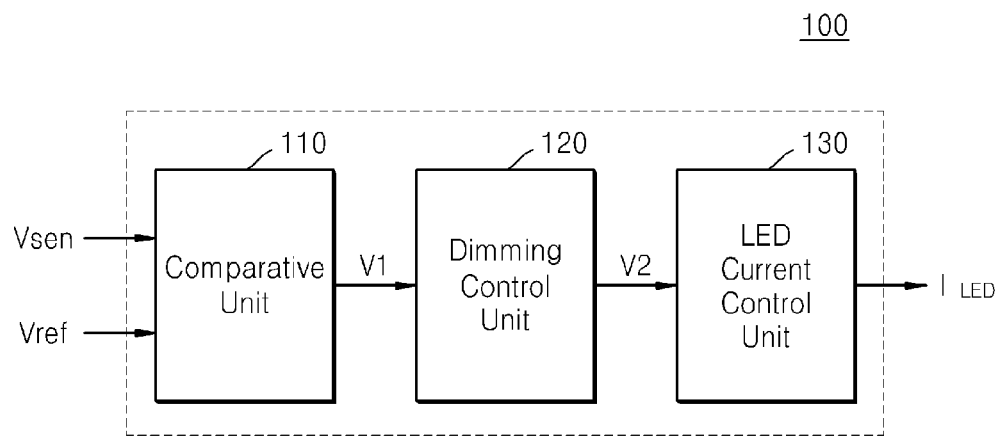
FIG. 1 is a block diagram of a light-emitting diode (LED) driver, according to an exemplary embodiment.

Hereinafter, exemplary embodiments will be described more fully with reference to the accompanying drawings, in which exemplary embodiments of the inventive concept are shown. An exemplary embodiment may, however, be embodied in many different forms and should not be construed as limited to exemplary embodiments set forth herein. Rather, these exemplary embodiments are provided so that this disclosure will be thorough and complete, and will fully convey the scope of the inventive concept to one of ordinary skill in the art. Like reference numerals in the drawings denote like elements. Sizes of components in the drawings may be exaggerated for convenience of explanation.

The terms used in the present specification are merely used to describe particular exemplary embodiments, and are not intended to limit the present inventive concept. An expression used in the singular form encompasses the expression in the plural form, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

While such terms as "first," "second," etc., may be used to describe various components, such components must not be limited to the above terms. The above terms are used only to distinguish one component from another. For example, a "first element" may be referred to as a "second element," and vice versa.

Unless defined otherwise, all terms used in the description including technical or scientific terms have the same meaning as generally understood by one of ordinary skill in the art. It will be further understood that terms, such as those defined in commonly used dictionaries, should be interpreted as having a meaning that is consistent with their meaning in the context of the related art, and should not be interpreted as having ideal or excessively formal meanings unless it is clearly defined in the specification.

Expressions such as "at least one of," when preceding a list of elements, modify the entire list of elements and do not modify the individual elements of the list.

FIG. 1 is a block diagram of a light-emitting diode (LED) driver 100, according to an exemplary embodiment.

Referring to FIG. 1, the LED driver 100 may include a comparative unit 110 (e.g., comparer), a dimming control unit 120 (e.g., dimming controller), and an LED current control unit 130 (e.g., LED current controller). For example, the LED driver 100 may be any apparatus that is configured to perform various functions, such as an apparatus that controls such that a constant current is provided to an LED array L_A including a plurality of LEDs and configured to be maintained at a predetermined level. Hereinafter, one or more exemplary embodiments will be described assuming that the LED driver 100 is the apparatus that controls such that the constant current is provided to the LED array L_A and maintained at the predetermined level.

The comparative unit 110 may compare various input signals, generate (e.g., obtain) a first output signal V1, and provide the first output signal V1 to the dimming control unit 120. For example, a sensing signal Vsen and a reference signal Vref, which are based on a current flowing to an LED from the outside, may be input to the comparative unit 110. According to a result obtained by comparing the LED sensing signal Vsen and the reference signal Vref, the comparative unit 110 may generate the first output signal V1, and provide the first output signal V1 to the dimming control unit 120.

According to an exemplary embodiment, the dimming control unit 120 may include at least one circuit of a voltage level limiting unit (e.g., voltage level limiter) and a voltage divider unit (e.g., voltage divider). The voltage level limiting unit and/or the voltage divider unit may be connected to an input/output (I/O) terminal such as a signal terminal of the dimming control unit 120. When the dimming control unit 120 includes the voltage level limiting unit, the dimming control unit 120 may be connected to a power supply terminal of the comparative unit 110, and when the dimming control unit 120 includes the voltage divider unit, the dimming control unit may be connected to an output terminal of the comparative unit 110. The dimming control unit 120 may receive and control the first output signal V1. According to an exemplary embodiment, the dimming control unit 120 may modify a level of the first output signal V1, and thereby generate a second output signal V2. A method of generating the second output signal V2 will be described in detail below. The dimming control unit 120 may provide the second output signal V2 to the LED current control unit 130. However, it is understood that one or more other exemplary embodiments are not limited thereto. For example, according to another exemplary embodiment, the second output signal V2 may be provided to the LED current control unit 130 by the comparative unit 110, and the dimming control unit 120 and the LED current control unit 130 may not be connected to each other.

According to an exemplary embodiment, the LED current control unit 130 may include a converter and a converter control unit (e.g., converter controller). Furthermore, the LED current control unit 130 may also include a pulse width modulation (PWM) signal generating unit (e.g., PWM signal generator). The converter may be a non-isolated buck converter, a boost converter, a buck-boost converter, an isolated fly-back converter, a forward converter, a half-bridge inverter, a full-bridge inverter, or a single-stage converter. The converter control unit may be configured differently according to characteristics of each converter. The converter control unit may be connected to an I/O terminal of the LED current control unit 130, and the converter may be connected to an output terminal of the LED current control unit 130. However, according to an exemplary embodiment in which the PWM signal generating unit is included, the PWM signal generating unit may be connected to an input terminal of the LED current control unit 130. The LED current control unit 130 may receive the second output signal V2, turn on/off a switch unit (e.g., switch) of the converter based on the second output signal V2, and provide an LED current $I_{LED}$ that controls a dimming of the LED to the LED array L_A. According to an exemplary embodiment, the LED current control unit 130 may output a large LED current $I_{LED}$ so that a luminance of the LED is high, and may output a small LED current $I_{LED}$ so that a luminance of the LED is low. Details will be described below. According to an exemplary embodiment, the dimming of the LED is controlled by controlling the first output signal V1 of the comparative unit 110, and thus, errors that occur when controlling input signals of the comparative unit 110 may be reduced.

Figure 2:
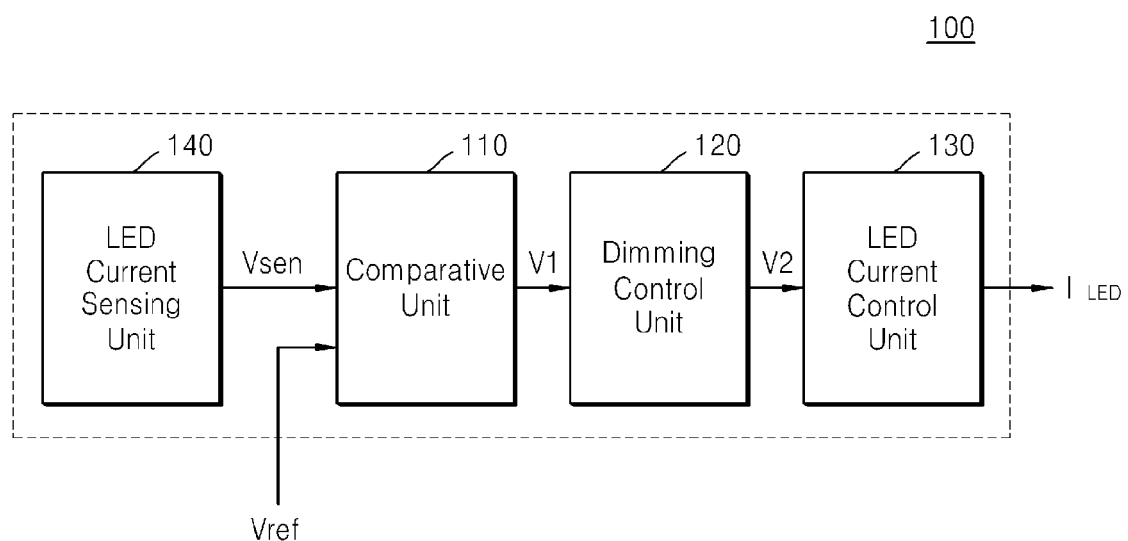
FIG. 2 is a block diagram of an LED driver, according to an exemplary embodiment.

FIG. 2 is a block diagram of the LED driver 100, according to an exemplary embodiment.

Referring to FIG. 2, the LED driver 100 of FIG. 1 may further include an LED current sensing unit 140 (e.g., LED current sensor). The LED current sensing unit 140 may sense an LED current that flows through the LED array L_A, generate a sensing signal Vsen that corresponds to the LED current, and provide the sensing signal Vsen to the comparative unit 110. According to an exemplary embodiment, the LED current sensing unit 140 may include a resistor unit including at least one resistor. In order to reduce heat emission of the LED current sensing unit 140, the LED current sensing unit 140 may configured such that a minimum amount of LED current that may be sensed flows through the resistor unit that senses the LED current.

Figure 3:
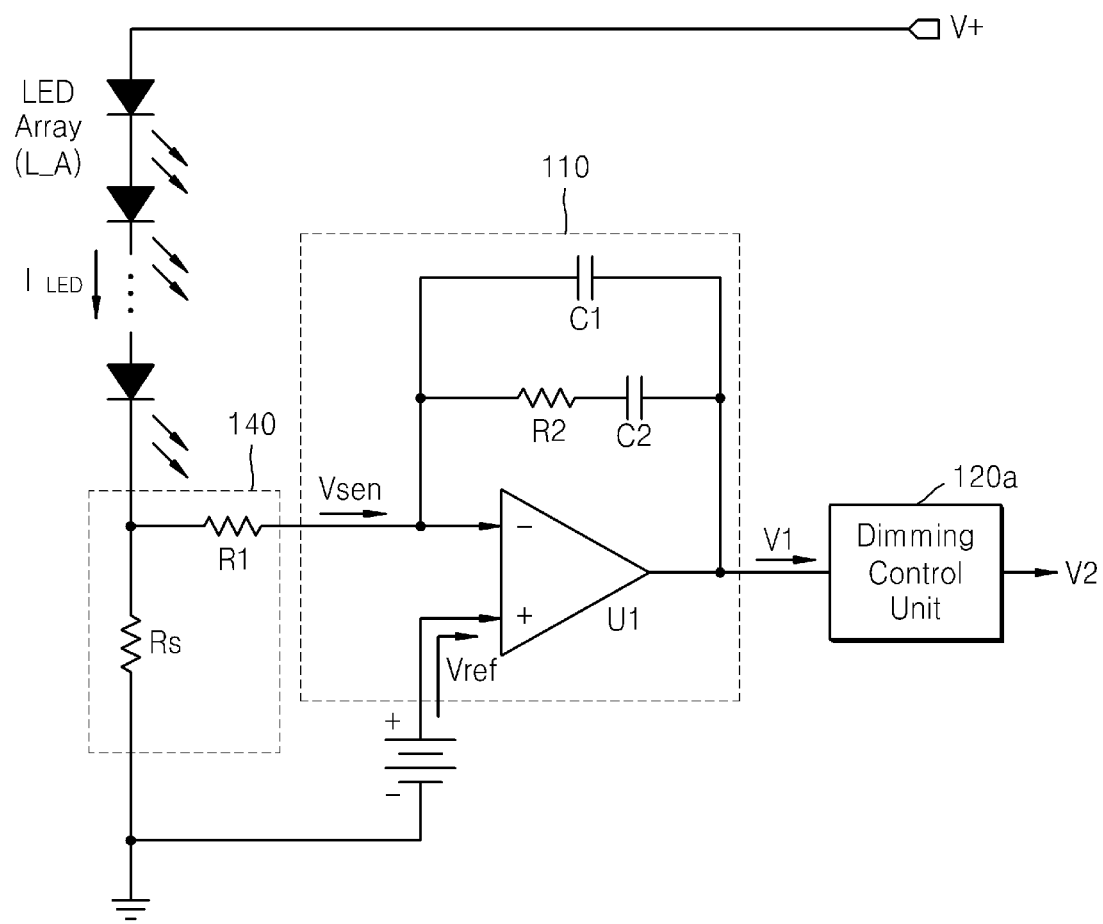
FIG. 3 is a circuit diagram of a comparative unit of FIG. 1 and an LED current sensing unit.

FIG. 3 is a circuit diagram of the comparative unit 110 of FIG. 1 and the LED current sensing unit 140.

Referring to FIG. 3, the LED current sensing unit 140 according to an exemplary embodiment may include a third resistor Rs and a fourth resistor R1. The LED current sensing unit 140 may receive the LED current $I_{LED}$ that flows through the LED array L_A, and convert the received LED current $I_{LED}$ such that some of the received LED current $I_{LED}$ flows through the third resistor Rs while the remainder of the received LED current $I_{LED}$ flows through the fourth resistor R1. The sensing signal Vsen may be generated based on a value of the portion of the received LED current $I_{LED}$ that flows through the fourth resistor R1. The generated sensing signal Vsen is equal to or corresponds to the voltage drop across the fourth resistor R1. The LED current sensing unit 140 may provide the sensing signal Vsen to the comparative unit 110. However, it is understood that one or more other exemplary embodiments are not limited thereto. The LED current sensing unit 140 may be configured in various ways by including at least one resistor, and the sensing signal Vsen is not limited to the voltage output by the LED current sensing unit 140.

The comparative unit 110 according to an exemplary embodiment may include an operational amplifier U1, a resistor R2, and capacitors C1 and C2. However, it is understood that one or more other exemplary embodiments are not limited thereto, and the comparative unit 110 may include various elements that are configured to amplify a difference of input signals. The comparative unit 110 may receive the sensing signal Vsen from the LED current sensing unit 140, and receive the reference signal Vref from the outside. The comparative unit 110 may amplify a difference between the received sensing signal Vsen and the received reference signal Vref in the operational amplifier U1, and then generate the amplified difference as the first output signal V1. According to an exemplary embodiment, when the sensing signal Vsen is greater than the reference signal Vref, the first output signal V1 is reduced, and when the sensing signal Vsen is less than the reference signal Vref, the first output signal V1 is increased. The comparative unit 110 may provide the generated first output signal V1 to the dimming control unit 120. According to an exemplary embodiment, since the LED current $I_{LED}$ is greater than an ideal value when the sensing signal Vsen is greater than the reference signal Vref, the comparative unit 110 may reduce the first output signal V1 provided to the dimming control unit 120a, thereby outputting the second output signal V2 to the LED current control unit 130, and the LED current control unit 130 may control the LED current $I_{LED}$ such that the LED current $I_{LED}$ is similar to the ideal value. Alternatively, when the sensing signal Vsen is less than the reference signal Vref, the LED current control unit 130 may control the LED current $I_{LED}$ in the same method.

Figure 4:
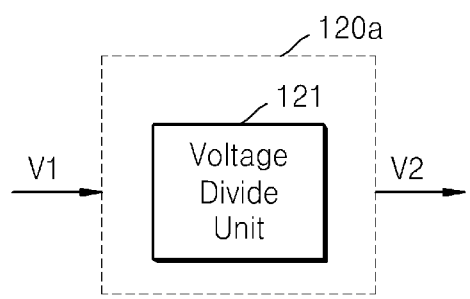
FIG. 4 is a block diagram of a dimming control unit of FIG. 3.

FIG. 4 is a block diagram of the dimming control unit 120 of FIG. 3.

Referring to FIG. 4, the dimming control unit 120 may include a voltage divider unit 121 (e.g., voltage divider). The voltage divider unit 121 may be connected to an I/O terminal of the dimming control unit 120, and may include a resistor unit that includes at least one resistor. The second output signal V2 may be generated based on the first output signal V1 received in the comparative unit 110. For example, when the first output signal V1 has a voltage level of 10V, the voltage divider unit 121 may divide the first output signal V1, and thus generate a second output signal V2 that has a voltage level of 5V. However, it is understood that one or more other exemplary embodiments are not limited thereto. For example, according to one or more other exemplary embodiments, the first output signal V1 may be divided according to various ratios so that the generated second output signal V2 is appropriate for controlling the dimming of the LED. The dimming control unit 120 may provide the generated second output signal V2 to the LED current control unit 130 by using the voltage divider unit 121.

Figure 5:
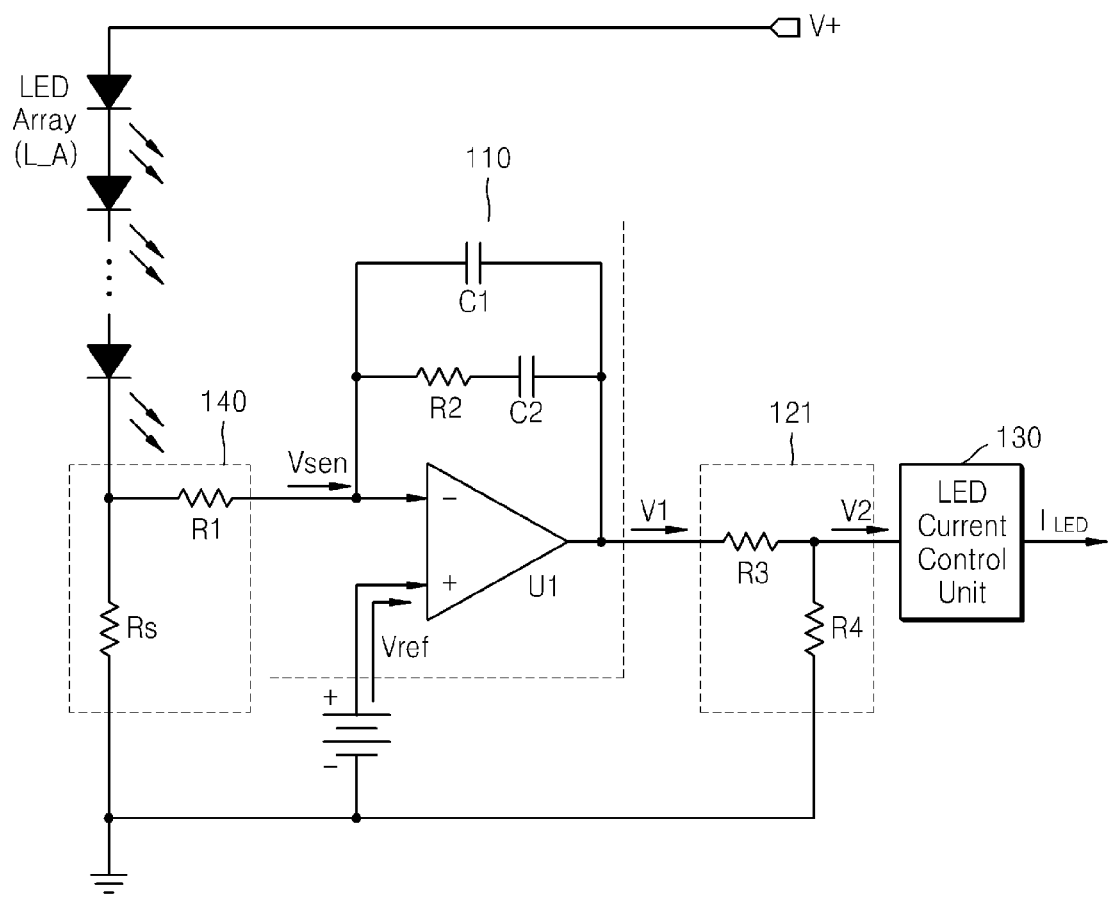
FIG. 5 is a circuit diagram of a voltage divider unit included in a dimming control unit of FIG. 3.

FIG. 5 is a circuit diagram of the voltage divider unit 121 included in the dimming control unit 120 of FIG. 3.

Referring to FIG. 5, the dimming control unit 120 may include the voltage divider unit 121, and the voltage divider unit 121 may include a resistor unit including a first resistor R3 and a second resistor R4. The voltage divider unit 121 may divide a first output signal V1 that is received from the comparative unit 110 and output a second output signal V2 that is equal to a voltage drop across the second resistor R4. For example, a voltage drop across the second resistor R4 may be equal to $$\frac{R4}{R3+R4}*V1.$$

A second output signal V2, which is equal to the voltage drop across the second resistor R4, is provided to the LED current control unit 130. However, it is understood that one or more other exemplary embodiments are not limited thereto, and the voltage divider unit 121 may include a resistor unit that includes at least two resistors. The second output signal V2 may be generated by dividing the first output signal V1 according to various resistance ratios by using elements to which various resistors are connected, and thus, the dimming may be controlled by variously adjusting the luminance of the LED.

Figure 6:
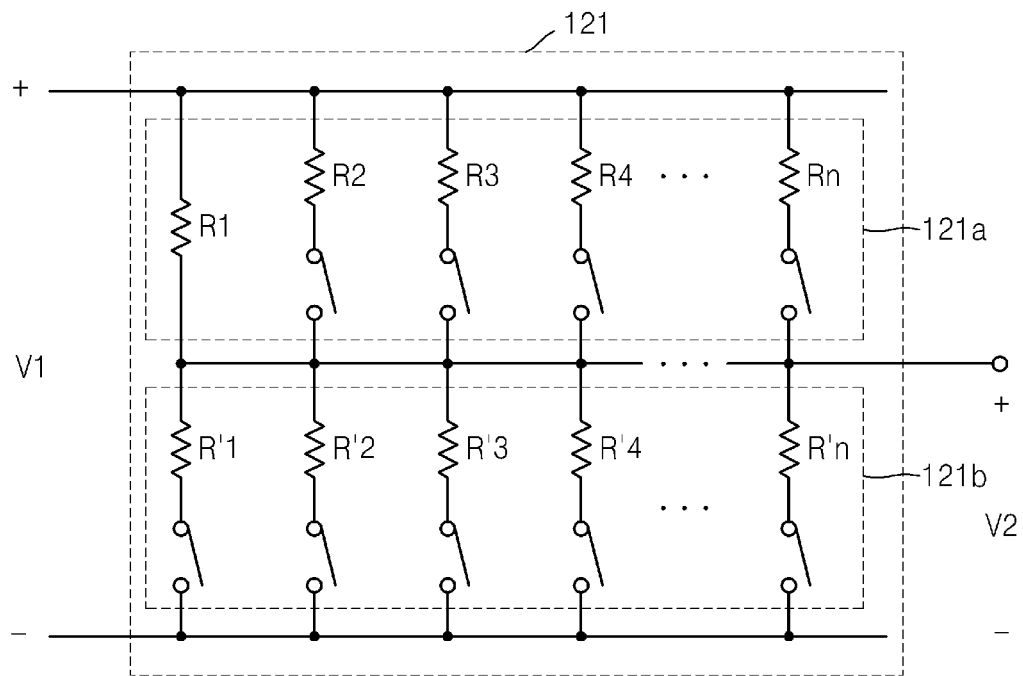
FIG. 6 is a circuit diagram of a voltage divider unit, according to an exemplary embodiment.

FIG. 6 is a circuit diagram of the voltage divider unit 121, according to an exemplary embodiment.

Referring to FIG. 6, the voltage divider unit 121 may include a first resistor unit 121a in which first resistors R1 to Rn are connected in parallel, and a second resistor unit 121b in which second resistors R'1 to R'n are connected in parallel. The first and second resistor units 121a and 121b may be connected in series, and switches may be connected to resistors other than a resistor R1. Accordingly, by turning on/off the switches included in the first and second resistor units 121a and 121b, various resistance ratios of the first and second resistor units 121a and 121b may be obtained. Based on the various resistance ratios, the first output signal V1 may be divided, and thus, the second output signal V2 may be generated. For example, a voltage drop across the second resistor unit 121b may correspond to the second output signal V2. However, it is understood that one or more other exemplary embodiments are not limited thereto. For example, each resistor unit may include at least one resistor and at least one switch, and other various exemplary embodiments may be provided.

Figure 7:
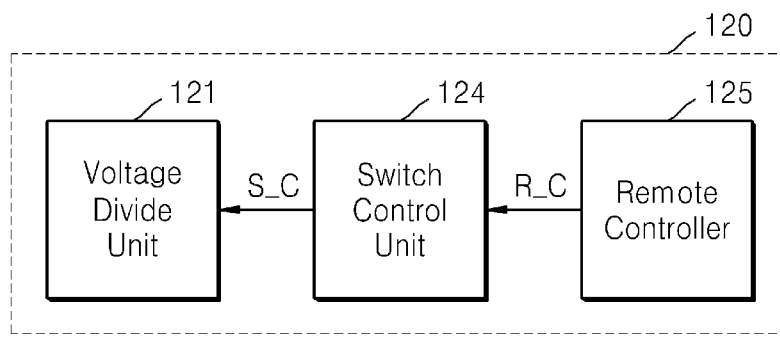
FIG. 7 is a block diagram of a dimming control unit, according to an exemplary embodiment.

FIG. 7 is a block diagram of the dimming control unit 120, according to an exemplary embodiment.

Referring to FIG. 7, the dimming control unit 120 may include the voltage divider unit 121 and a switch control unit 124 (e.g., switch controller). According to an exemplary embodiment of the voltage divider unit 121 shown in FIG. 6, the switch control unit 124 may control the switches connected to the resistors and thus turn on/off the switches. In order to obtain an luminance of the LED which a user desires, the switch control unit 124 may calculate, determine, or obtain a resistance ratio of the first and second resistor units 121a and 121b, i.e., the resistance ratio that the voltage divider unit 121 uses to generate the second output signal V2 that corresponds to the luminance of the LED. The switch control unit 124 may determine a resistor that is to be connected in the voltage divider unit 121 based on the calculated resistance ratio, and thus provide a switch control signal S_C to the voltage divider unit 121. According to an exemplary embodiment, the dimming control unit 120 may further include a remote controller 125. The remote controller 125 may receive a remote signal from a remote control or a remote controlling device (e.g., a computing device such as a mobile phone, a portable terminal, a tablet device, a personal computer, a laptop computer, etc.) and provide a remote control signal R_C that may control the switch control unit 124 to the switch control unit 124 so that the user may remotely control the dimming of the LED by using the remote control or the like. The remote control signal may be received via an infrared communication, a Bluetooth communication, a ZigBee communication, a near field communication, a local area wireless communication, a WiFi communication, a wired communication, an Ethernet communication, etc.

Figure 8:
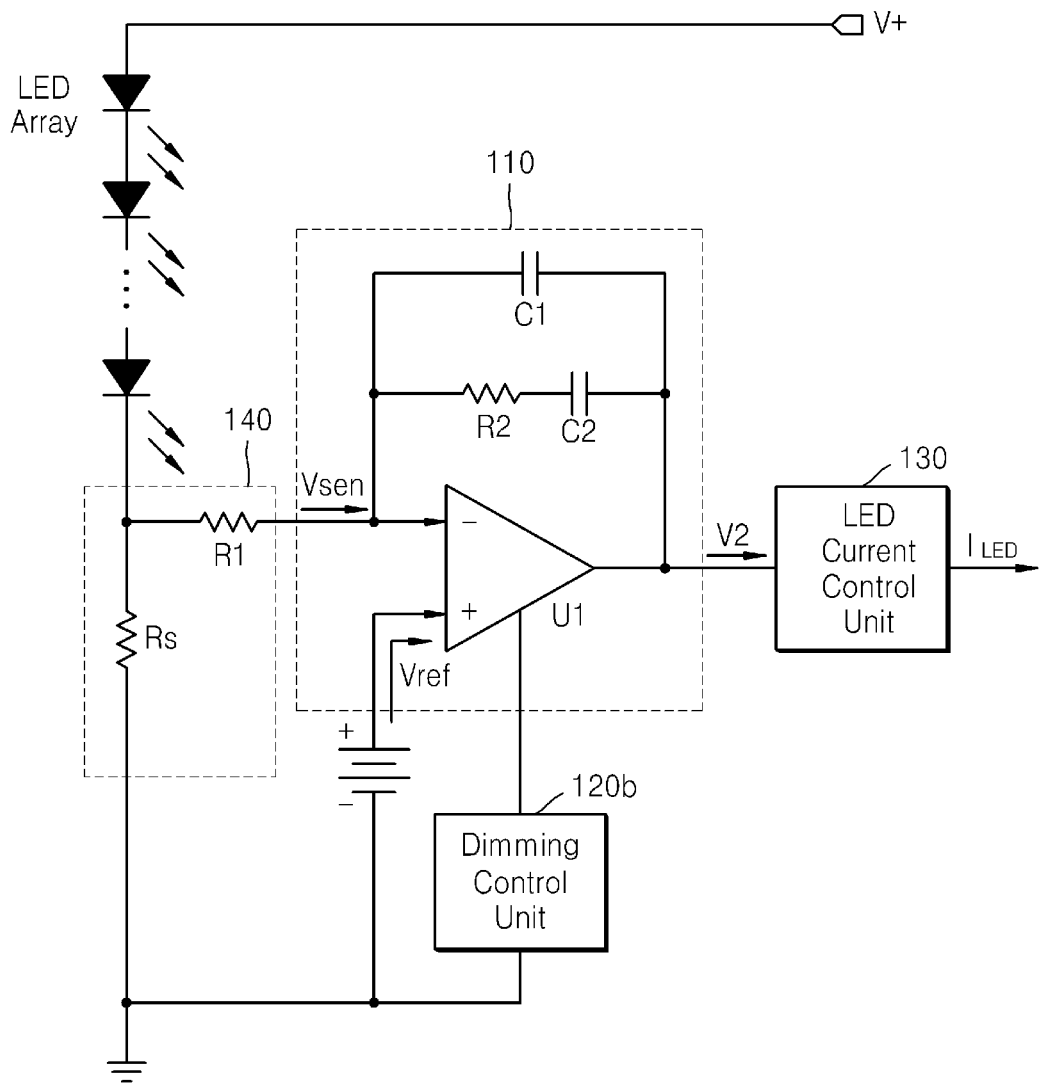
FIG. 8 is a block diagram of a connection structure of a dimming control unit, according to an exemplary embodiment.

FIG. 8 is a block diagram of a connection structure of a dimming control unit 120*b*, according to an exemplary embodiment.

Referring to FIG. 8, unlike FIG. 3, the dimming control unit 120*b* may be connected to a power supply terminal of the operational amplifier U1 of the comparative unit 110. The LED current control unit 130 may be connected to the output terminal of the comparative unit 110. In other words, the operational amplifier U1 included in the comparative unit 110 may generate the first output signal V1, and the dimming control unit 120*b* may generate a second output signal V2 by limiting a level of the first output signal V1. Also, the dimming control unit 120*b* may modify the level of the first output signal V1 into other levels. Although FIG. 8 illustrates that the second output signal V2 is output from the comparative unit 110, the second output signal V2 may be regarded as a signal generated by the dimming control unit 120*b*. The comparative unit 110 may provide the generated second output signal V2 to the LED control unit 130. According to an exemplary embodiment, the dimming control unit 120*b* may be connected to power supply terminals of the operational amplifier U1. The dimming control unit 120*b* may limit the first output signal V1 of the operational amplifier U1 to various levels, and thus generate a second output signal V2 having various level ranges. The LED current control unit 130 may generate the LED current $I_{LED}$ that flows through the LED array L_A based on the received second output signal V2. The generated LED current $I_{LED}$ may be input via a V+ terminal and flow through the LED array L_A, and thus, the dimming of the LED is effective according to a level of the second output signal V2.

Figure 9:
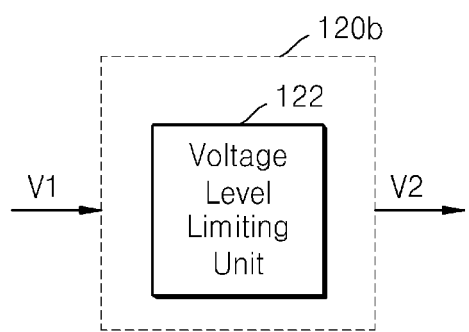
FIG. 9 is a block diagram of a dimming control unit that includes a voltage level limiting unit, according to an exemplary embodiment.

FIG. 9 is a block diagram of the dimming control unit 120*b* that includes a voltage level limiting unit 122, according to an exemplary embodiment.

Referring to FIG. 9, the dimming control unit 120*b* may include the voltage level limiting unit 122 (e.g., voltage level limiter). The voltage divider unit 122 may be connected to the I/O terminal of the dimming control unit 120*b*, and may include a resistor unit that includes at least one resistor, and at least one power source. The second output signal V2 may be generated based on the first output signal V1 received from the comparative unit 110. For example, when the first output signal V1 has a voltage level of 10V, the voltage level limiting unit 122 may limit the voltage level of the first output signal V1, and thus generate the second output signal V2 that has a voltage level of 5V. However, it is understood that one or more other exemplary embodiments are not limited thereto, and the first output signal V1 may be limited to various levels so as to generate a second output signal V2 that is appropriate for controlling the dimming of the LED. The dimming control unit 120 may provide the generated second output signal V2 to the LED current control unit 130 by using the voltage level limiting unit 122. However, it is understood that one or more other exemplary embodiments are not limited thereto. For example, according to another exemplary embodiment, the voltage divider unit 121 described with reference to FIG. 4 may be further included, and thus, the second output signal V2 may be generated by dividing the first output signal V1 according to a resistance ratio, or controlling the first output signal V1 by using methods such as limiting the first output signal V1 to a predetermined level.

Figure 10:
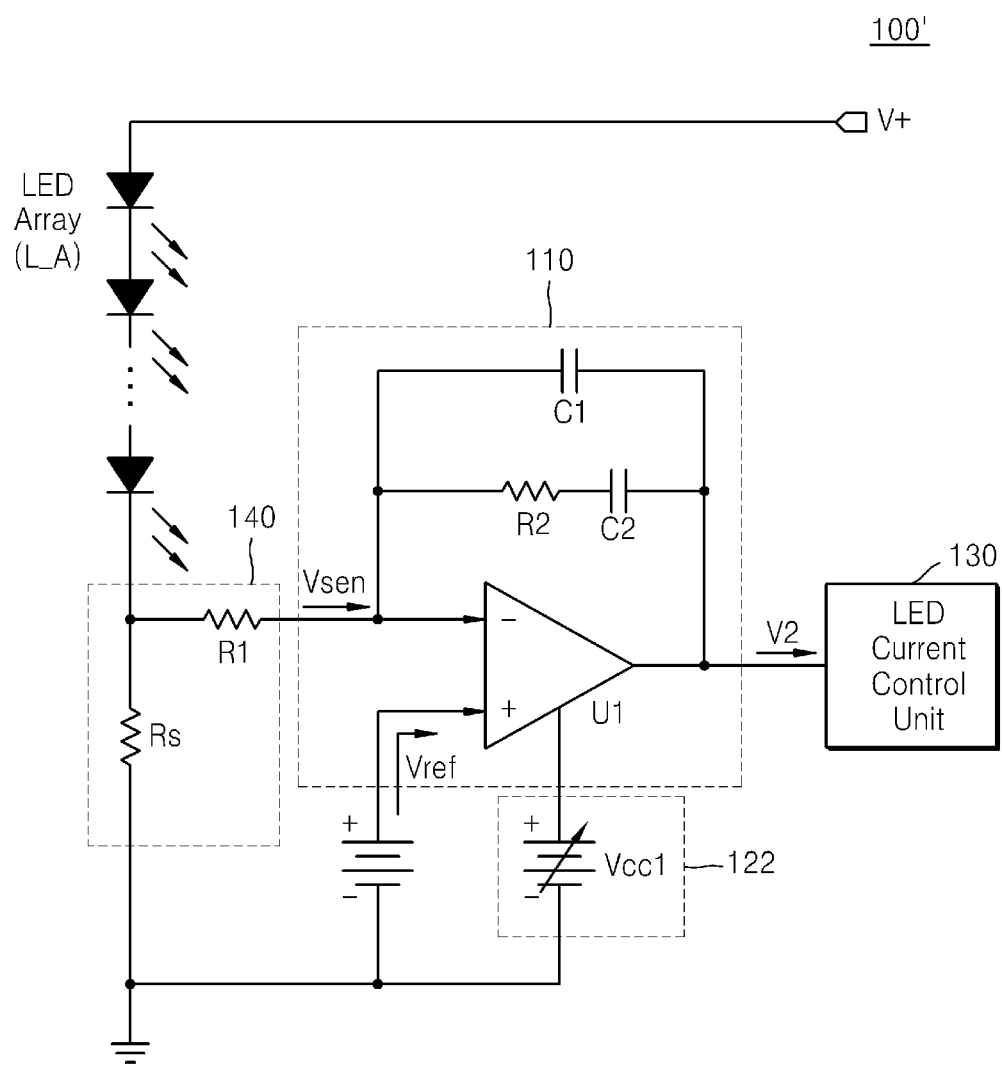
FIG. 10 is a circuit diagram of a voltage level limiting unit included in a dimming control unit of FIG. 8, according to an exemplary embodiment.

FIG. 10 is a circuit diagram of the voltage level limiting unit 122 included in the dimming control unit 120*b* of FIG. 8, according to an exemplary embodiment. In FIG. 10, an LED driver 100' according to an exemplary embodiment is illustrated.

Referring to FIG. 10, the dimming control unit 120*b* may include the voltage level limiting unit 122. The voltage level limiting unit 122 may include a variable power source Vcc1 that includes at least one variable power source device. The voltage level limiting unit 122 may control the first output signal V1 that is generated in the comparative unit 110 such that a level of the first output signal V1 is limited up to a voltage level of the variable power source Vcc1. For example, when a voltage value of the variable power source Vcc1 is 5V and a voltage level of the first output signal V1 is 10V, a voltage level range of the first output signal V1 is limited to 5V, and a second output signal V2 having a voltage level of 5V may be generated based on the limited first output signal V1. According to another exemplary embodiment, the voltage level limiting unit 122 may be connected to another power supply terminal of the operational amplifier U1 of the comparative unit 110, and control the first output signal V1 by determining a minimum voltage level range of the first output signal V1. The second output signal V2 is provided to the LED current control unit 130. However, it is understood that one or more other exemplary embodiments are not limited thereto, and the voltage level limiting unit 122 may include at least one resistor unit that includes at least one resistor, and the at least one resistor unit may include a power source. The voltage level limiting unit 122 of the dimming control unit 120*b* may limit the first output signal V1 to various voltage levels, and thus generate a second output signal V2 having various voltage levels. The generated second output signal V2 may be provided to the LED current control unit 130 from the comparative unit 110.

Figure 11:
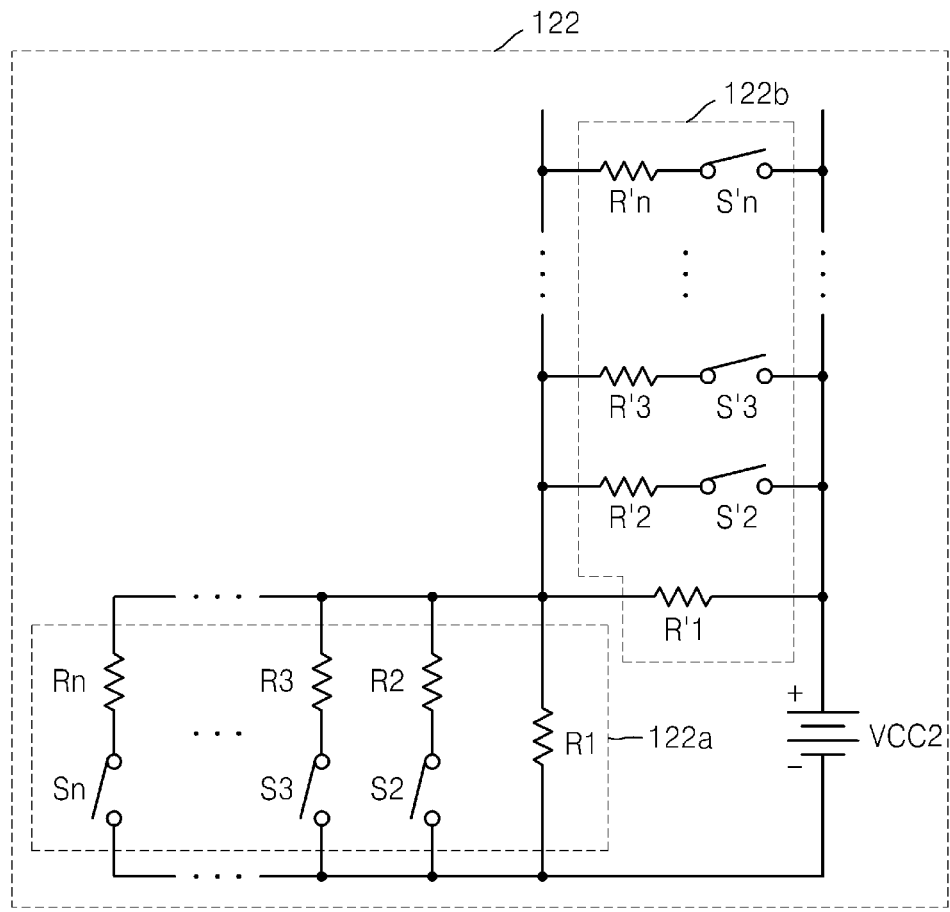
FIG. 11 is a circuit diagram of a voltage level limiting unit, according to an exemplary embodiment.

FIG. 11 is a circuit diagram of the voltage level limiting unit 122, according to an exemplary embodiment.

Referring to FIG. 11, the voltage level limiting unit 122 may include a first resistor unit 122*a* in which first resistors R1 to Rn are connected in parallel, and a second resistor unit 122*b* in which second resistors R'1 to R'n are connected in parallel. The first and second resistor units 122*a* and 122*b* may be connected in series, and switches may be connected to resistors other than at least one of resistors R1 and R'1. Also, a voltage power source Vcc2 may be connected to a terminal of the second resistor unit 122*b*. Accordingly, by turning on/off the switches included in the first and second resistor units 122*a* and 122*b*, various resistance ratios based on the first and second resistor units 122*a* and 122*b* may be obtained. Based on the various resistance ratios, a voltage value of the voltage power source Vcc2 may be divided, and thus, a voltage equal to the voltage drop across the first resistor unit 122*a* may be supplied to the comparative unit 110. Therefore, a variable voltage may be provided according to a degree of the dimming of the LED by the variable power source Vcc1 of FIG. 10.

The level of the first output signal V1 may be limited according to the voltage level that is supplied to the comparative unit 110. However, it is understood that one or more other exemplary embodiments are not limited thereto. For example, each resistor unit may include at least one resistor and at least one switch, and voltage power sources may be connected in various ways according to structures configurations of resistors and switches. Therefore, various exemplary embodiments may be provided.

Figure 12:
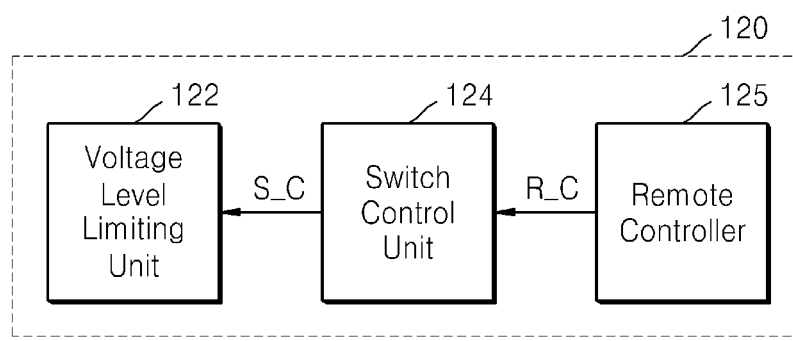
FIG. 12 is a block diagram of a dimming control unit, according to an exemplary embodiment.

FIG. 12 is a block diagram of the dimming control unit 120, according to an exemplary embodiment.

Referring to FIG. 12, the dimming control unit 120 may include the voltage level limiting unit 122 and the switch control unit 124. According to an exemplary embodiment of the voltage level limiting unit 122 of FIG. 11, the switch control unit 124 may control the switches connected to each resistor and thus turn on/off the switches. In order to reduce the luminance of the LED to a user-preferred level, the switch control unit 124 may calculate a limitation degree of a voltage level of the first output signal V1 so that the voltage level limiting unit 122 may generate a second output signal V2 that corresponds to the reduced luminance of the LED. The switch control unit 124 may determine a resistor that is to be connected in the voltage level limiting unit 122 based on the calculated limitation degree, and thus provide a switch control signal S_C to the voltage level limiting unit 122. According to an exemplary embodiment, the dimming control unit 120 may further include the remote controller 125. The remote controller 125 may receive a remote signal from a remote control or a remote controlling device and provide a remote control signal R_C that may control the switch control unit 124 to the switch control unit 124 so that the user may remotely control the dimming of the LED by using the remote control or the like.

Figure 13:
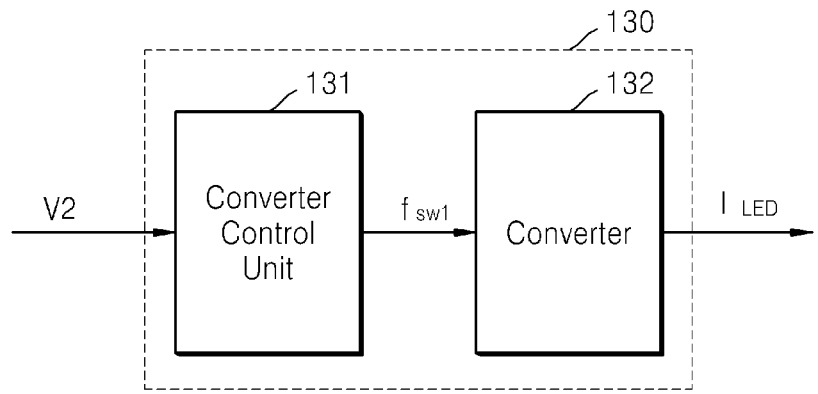
FIG. 13 is a block diagram of an LED current control unit, according to an exemplary embodiment.

FIG. 13 is a block diagram of the LED current control unit 130, according to an exemplary embodiment.

Referring to FIG. 13, the LED current control unit 130 may include a converter control unit 131 (e.g., converter controller) and a buck converter 132. Furthermore, the LED current control unit 130 may also include a buffer unit (e.g., buffer) that may temporarily store the second output signal V2. For example, the buck converter 132 may be a non-isolated buck converter, a boost converter, a buck-boost converter, an isolated fly-back converter, a forward converter, a half-bridge inverter, a full-bridge inverter, or a single-stage converter. The converter control unit 131 may be configured differently according to characteristics of each converter.

The converter control unit 131 may receive the second output signal V2 from the outside, and control the buck converter 132 based on the second output signal V2. For example, the converter control unit 131 may control a switch unit (e.g., switch) of the buck converter 132. In this case, the converter control unit 131 may generate and provide a switch control signal fsw1 to the buck converter 132. The switch unit of the buck converter 132 may be turned on/off according to the received switch control signal fsw1. For example, a switching frequency may be controlled, and thus, the buck converter 132 may generate the LED current $I_{LED}$ according to the switching frequency and provide the LED current $I_{LED}$ to the LED array L_A. According to an exemplary embodiment, in the converter control unit 131, at least two resistors may be connected in parallel, each resistor may be connected to a switch unit, and a plurality of total resistance values may be obtained by controlling the on/off of the switch unit. The converter control unit 131 may provide a switching frequency that corresponds to each of the plurality of total resistors connected to the buck converter 132. For example, in the converter control unit 131, resistors R1 (10Ω), R2 (10Ω), and R3 (10Ω) may be connected in parallel, and switches may be connected to the resistors R2 and R3. In this case, when the switches connected to the resistors R2 and R3 are open, a total resistance may be equal to 10Ω, and when the switch connected to the resistor R2 is closed but the switch connected to the resistor R3 is open, a total resistance may be equal to 5Ω. Also, when the switches are all closed, the total resistance may be equal to 3.33Ω. A switching frequency corresponding to 10Ω may be 2 kHz, a switching frequency corresponding to 5Ω may be 1 kHz, and a switching frequency corresponding to 3.33Ω may be 500 kHz. Switching frequencies that are necessary for controlling dimming may be provided to the buck converter 132. In addition, in order to provide the switching frequencies that are necessary for controlling dimming, a signal other than the second output signal V2 may be received from the outside and may be used to turn on/off a switch connected to at least one of the at least two resistors connected in parallel. However, it is understood that one or more other exemplary embodiments are not limited thereto.

Figure 14:
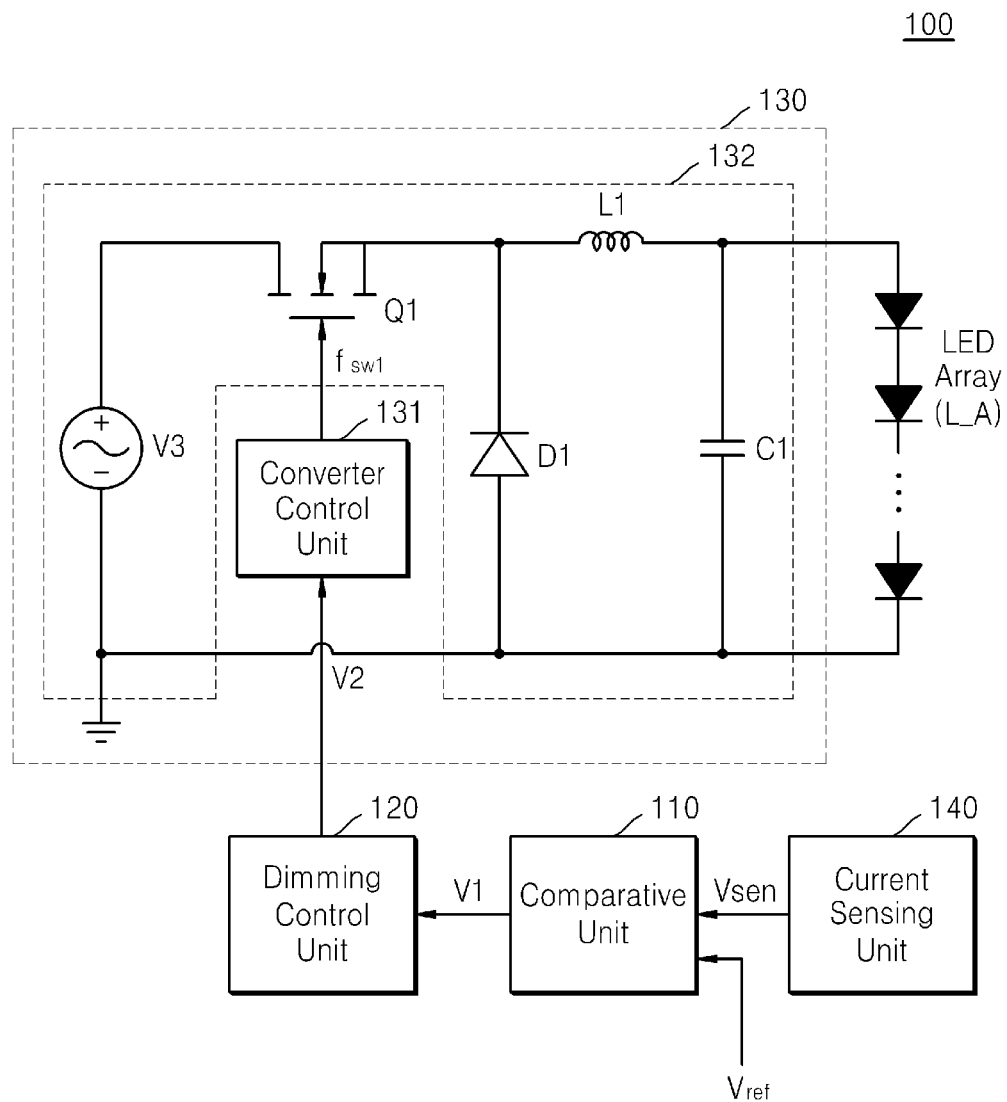
FIG. 14 is a block diagram of an LED driver that includes an LED current control unit, according to an exemplary embodiment.

FIG. 14 is a block diagram of the LED driver 100 that includes the LED current control unit 130, according to an exemplary embodiment.

As illustrated in FIG. 14, the LED driver 100 may include the LED current sensing unit 140, the comparative unit 110, the dimming control unit 120, and the LED current control unit 130. The LED current control unit 130 may include the converter control unit 131 and a buck converter 132, although it is understood that one or more other exemplary embodiments are not limited thereto. For example, according to another exemplary embodiment, instead of the buck converter 132, a boost converter or a buck-boost converter may be included.

As described above, the LED current sensing unit 140 may sense the LED current $I_{LED}$ and provide the sensing signal Vsen to the comparative unit 110. The comparative unit 110 may compare the received sensing signal Vsen and the reference signal Vref that is received from the outside, and generate and provide the first output signal V1 to the dimming control unit 120. The dimming control unit 120 may modify the first output signal V1 that is output from the comparative unit 110, and thus generate the second output signal V2. The method of generating the second output signal V2 is described above, and thus will not be redundantly described below. The dimming control unit 120 may provide the second output signal V2 to the converter control unit 131. However, it is understood that one or more other exemplary embodiments are not limited thereto. For example, according to another exemplary embodiment, the comparative unit 110 may provide the second output signal V2 to the converter control unit 131.

The converter control unit 131 may control the buck converter 132 based on the second output signal V2. According to an exemplary embodiment, the converter control unit 131 may turn on/off a switch unit Q1 of the buck converter 132. For example, the converter control unit 131 may provide a switch control signal fsw1 for controlling the switch unit Q1 to the switch unit Q1 of the buck converter 132. The switch control signal fsw1 may control a switching frequency of the switch unit Q1. According to an exemplary embodiment, based on the second output signal V2, when the second output signal V2 is a signal for increasing the luminance of the LED, the switch control signal fsw1 may lower the switching frequency of the switch unit Q1, and thus reduce an input impedance of the buck converter 132. Therefore, due to the reduced input impedance, the LED current $I_{LED}$ that flows through the LED array L_A may be relatively higher than the LED current $I_{LED}$ before the switching frequency of the switch unit Q1 was lowered, and the luminance of the LED may be increased. Alternatively, when the second output signal V2 is for reducing the luminance of the LED, the switch control signal fsw1 may increase the switching frequency of the switch unit Q1, and thus increase the input impedance of the buck converter 132. Therefore, due to the increased input impedance, the LED current $I_{LED}$ that flows through the LED array L_A may be relatively smaller than the LED current $I_{LED}$ before the switching frequency of the switch unit Q1 was increased, and the luminance of the LED may be reduced.

The dimming control unit 120 does not control an input signal of the comparative unit 110, but controls an output signal of the comparative unit 110. Therefore, an error of the second output signal V2 may be reduced, and thus, the dimming of the LED may be controlled more accurately.

Figure 15:
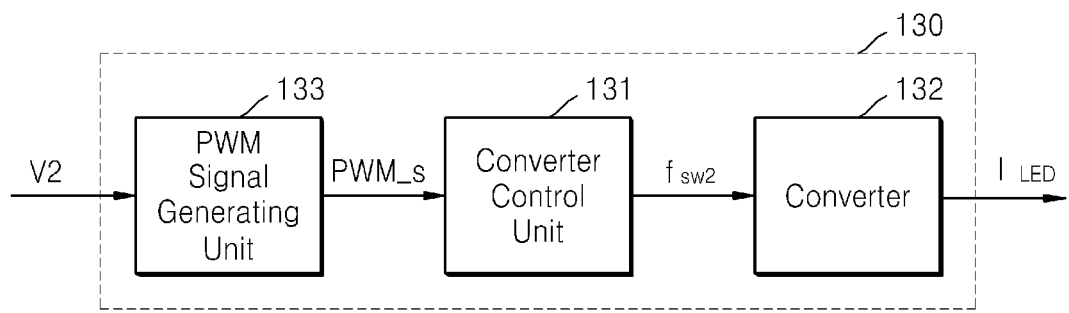
FIG. 15 is a block diagram of an LED current control unit, according to an exemplary embodiment.

FIG. 15 is a block diagram of the LED current control unit 130, according to an exemplary embodiment.

Referring to FIG. 15, a PWM signal generating unit 133 (e.g., PWM signal generator) may further be included in FIG. 13. The PWM signal generating unit 133 may receive the second output signal V2 from the outside, and generate a PWM signal PWM_s based on the second output signal V2. A method of generating the PWM signal PWM_s will be described below. The converter control unit 131 may receive the PWM signal PWM_s from the PWM signal generating unit 133, and control the buck converter 132 based on the PWM signal PWM_s. For example, the converter control unit 131 may control a switch unit of the buck converter 132. In this case, the converter control unit 131 may generate and provide a switch control signal fsw2 to the buck converter 132. The switch unit of the buck converter 132 may be turned on/off according to the received switch control signal fsw2. For example, the switch control signal fsw2 may be generated based on a duty ratio of the PWM signal PWM_s, and the buck converter 132 may generate the LED current $I_{LED}$ according to the duty ratio and provide the LED current $I_{LED}$ to the LED array L_A.

Figure 16A:
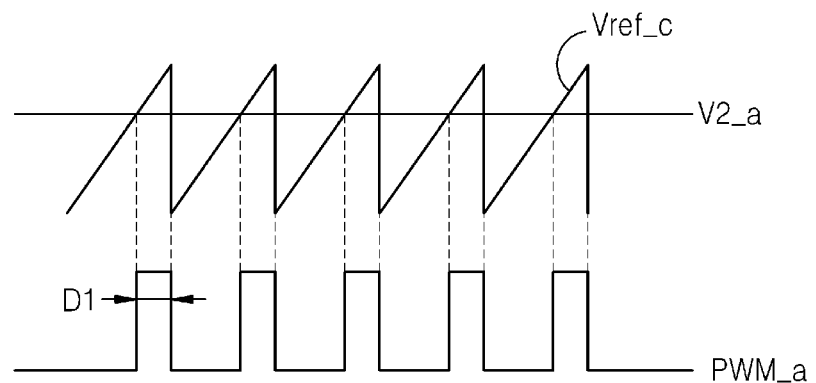
FIGS. 16A and 16B are views of a process of generating a pulse width modulation (PWM) signal, according to an exemplary embodiment.
Figure 16B:
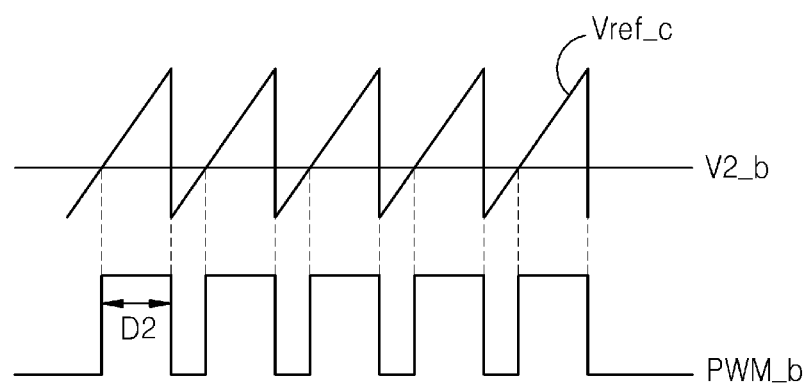

FIGS. 16A and 16B are views of a process of generating a PWM signal, according to an exemplary embodiment.

Referring to FIGS. 16A and 16B, a reference signal Vref_c having a shape of a saw tooth may be provided from the LED current control unit 130 or the outside. In (a) of FIG. 16A, a second output signal V2_a and the reference signal Vref_c may be compared. In (b) of FIG. 16A, a first PWM signal PWM_a may be generated having a first duty cycle pulse width D1 that is equal to a time period when the reference signal Vref_c is higher than the second output signal V2_a. In (a) of FIG. 16B, a second output signal V2_b, which is lower than the second output signal V2_a of FIG. 16A, may be compared to the reference signal Vref_c. In (b) of FIG. 16B, a second PWM signal PWM_b may be generated having a second duty cycle pulse width D2 that is equal to a time period when the reference signal Vref_c is higher than the second output signal V2_b.

The first PWM signal PWM_a and the second PWM signal PWM_b may be compared. Since the second duty cycle pulse width D2 of the second PWM signal PWM_b is greater than the first duty cycle pulse width D1 of the first PWM signal PWM_a, a PWM signal PWM_s having a different duty cycle pulse width may be generated based on the second output signal V2. Therefore, the dimming control unit 120 may control the first output signal V1 of the comparative unit 110, generate a second output signal V2 in which errors are reduced, and provide the generated second output signal V2 to the PWM signal generating unit 133. Accordingly, the PWM signal generating unit 133 may generate a PWM signal PWM_s that may accurately control the dimming of the LED.

Figure 17:
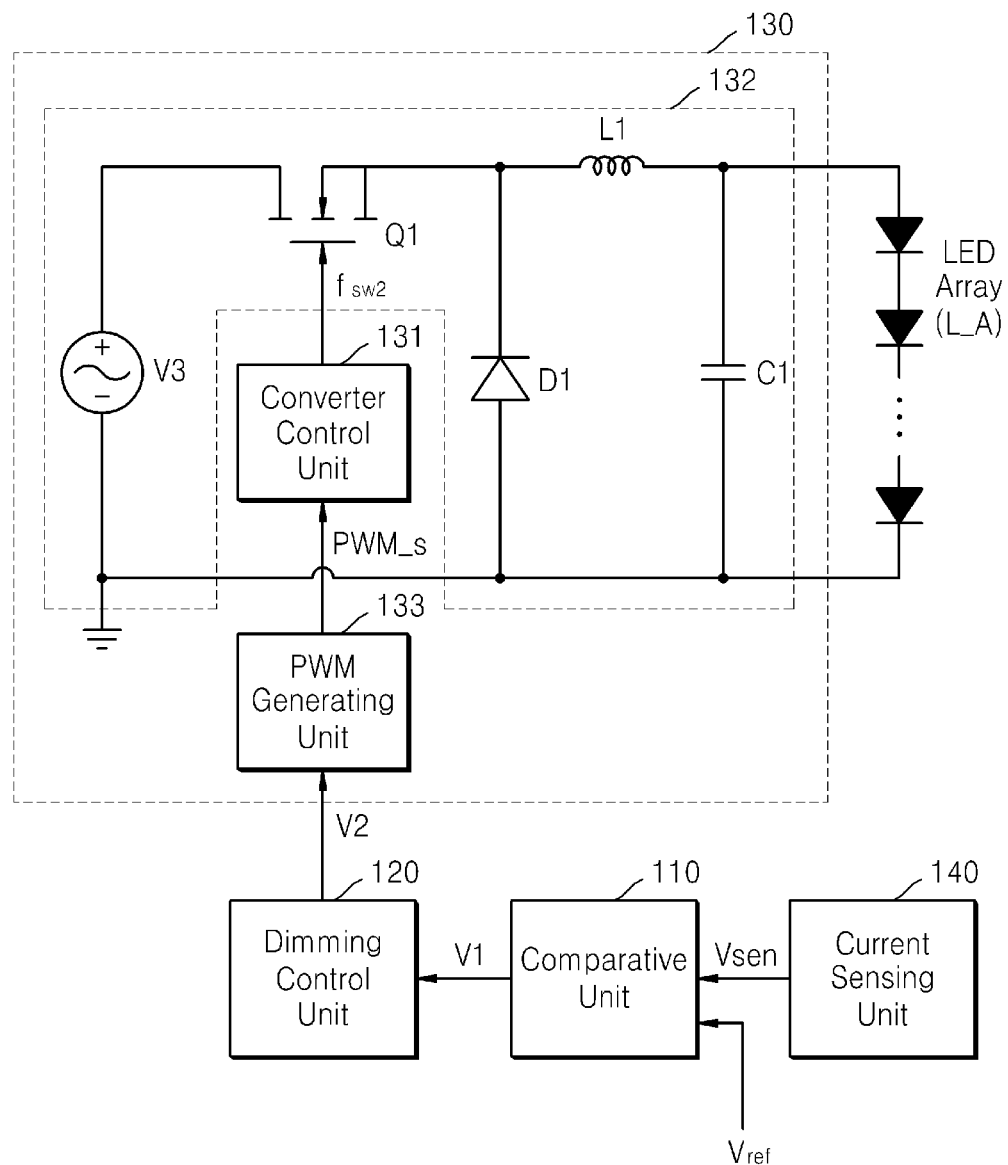
FIG. 17 is a block diagram of a block diagram of an LED driver that includes an LED current control unit, according to an exemplary embodiment.

FIG. 17 is a block diagram of the LED driver 100 that includes the LED current control unit 130, according to an exemplary embodiment.

The LED driver 100 may include the LED current sensing unit 140, the comparative unit 110, the dimming control unit 120, and the LED current control unit 130, as illustrated in FIG. 2. The LED current control unit 130 may include the converter control unit 131, the buck converter 132, and the PWM signal generating unit 133, although it is understood that one or more other exemplary embodiments are not limited thereto. For example, according to another exemplary embodiment, instead of the buck converter 132, a boost converter or a buck-boost converter may be included.

As described above, the LED current sensing unit 140 may sense the LED current $I_{LED}$ and provide the sensing signal Vsen to the comparative unit 110. The comparative unit 110 may compare the received sensing signal Vsen and the reference signal Vref that is received from the outside, and generate and provide the first output signal V1 to the dimming control unit 120. The dimming control unit 120 may modify the first output signal V1 that is output from the comparative unit 110, and thus generate the second output signal V2. The dimming control unit 120 may provide the second output signal V2 to the converter control unit 131. However, it is understood that one or more other exemplary embodiments are not limited thereto. For example, according to another exemplary embodiment, the comparative unit 110 may provide the second output signal V2 to the converter control unit 131.

As described above with reference to FIG. 15, the PWM signal generating unit 133 may generate the PWM signal PWM_s based on the second output signal V2, and provide the generated PWM signal PWM_s to the converter control unit 131. The converter control unit 131 may generate a converter control signal fsw3 based on the PWM signal PWM_s, and provide the generated converter control signal fsw3 to the buck converter 132. The buck converter 132 may generate the LED current $I_{LED}$ based on the converter control signal fsw3, and provide the LED current $I_{LED}$. According to an exemplary embodiment, the converter control unit 131 may turn on/off the switch unit Q1 of the buck converter 132. For example, the converter control unit 131 may provide the switch control signal fsw2 for controlling the switch unit Q1 to the switch unit Q1 of the buck converter 132. The switch control signal fsw2 may turn on/off the switch unit Q1 according to the PWM signal PWM_s that is provided to the converter control unit 131.

According to an exemplary embodiment, referring to FIG. 16B, in order to increase an luminance of the LED, the PWM signal generating unit 133 may generate a PWM signal PWM_b having a high duty ratio. According to the on/off timing of the PWM signal PWM_b, the converter control unit 131 may generate the switch control signal fsw2 that may turn on/off the switch unit Q1 of the buck converter 132, and provide the switch control signal fsw2 to the switch unit Q1 of the buck converter 132. Since the switch unit Q1 of the buck converter 132 has a high duty ratio and is turned on for a longer time than being turned off, a converter driving voltage V3 may be applied for a longer time. Therefore, the LED current $I_{LED}$ that flows through the LED array L_A is increased, and thus the luminance of the LED may be increased. In this case, the buck converter 132 is a buck converter, although it is understood that one or more other exemplary embodiments are not limited thereto. For example, the operation method of the buck converter 132 may vary according to a type of the buck converter 132, which may be a boost converter or a buck-boost converter.

According to another exemplary embodiment, referring to FIG. 16A, in order to reduce the luminance of the LED, the PWM signal generating unit 133 may generate a PMW signal PWM_a having a low duty ratio. According to the on/off timing of the PMW signal PWM_a, the converter control unit 131 may generate the switch control signal fsw2 that may turn on/off the switch unit Q1 of the buck converter 132, and provide the switch control signal fsw2 to the switch unit Q1 of the buck converter 132. Since the switch unit Q1 of the buck converter 132 may have a low duty ratio, and is turned off for a longer time than being turned on, the converter driving voltage V3 may be applied for a shorter time. Therefore, the LED current $I_{LED}$ that flows through the LED array L_A is reduced, and thus the luminance of the LED may be reduced. However, it is understood that one or more other exemplary embodiments are not limited thereto. For example, the dimming of the LED may be controlled by generating the PWM signal PWM_s in various ways based on the second output signal V2.

The dimming control unit 120 according to the present exemplary embodiment does not modify the input signal of the comparative unit 110, but modifies the output signal of the comparative unit 110. Therefore, an error of the second output signal V2 may be reduced, and thus a PWM signal PWM_s may be generated without errors. Accordingly, the dimming of the LED may be controlled more accurately.

Figure 18:
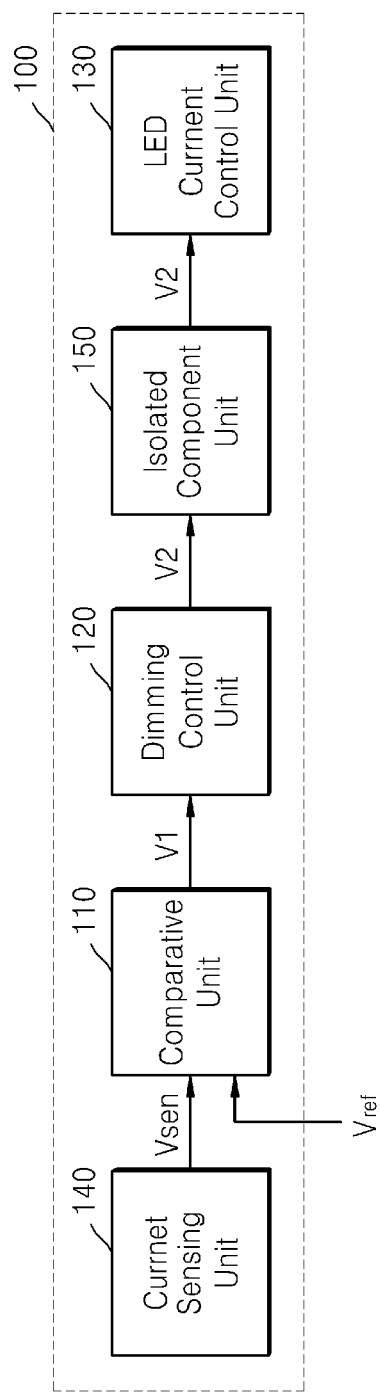
FIG. 18 is a block diagram of an LED driver, according to an exemplary embodiment.

FIG. 18 is a block diagram of the LED driver 100, according to an exemplary embodiment.

Referring to FIG. 18, the LED driver 100 may include the LED current sensing unit 140, the comparative unit 110, the dimming control unit 120, and the LED current control unit 130 as illustrated in FIG. 2, and further include an isolated component unit 150 (e.g., isolated component). According to an exemplary embodiment, the dimming control unit 120 and the LED current control unit 130 may be isolated and separated from each other. Therefore, the isolated component unit 150 may transfer the second output signal V2 that is provided by the dimming control unit 120 to the LED current control unit 130. According to an exemplary embodiment, the isolated component unit 150 may be at least one of a transformer and a photo coupler. The operations of the other elements are described above, and thus a detailed description thereof is not repeated below.

According to the drawings and the detailed description, a resistor and a voltage power source are respectively described as a resistance R and a direct current (DC) source. However, it is understood that one or more other exemplary embodiments are not limited thereto. For example, the resistor may be a passive device such as an inductor and capacitor, or an active device such as a metal-oxide semiconductor field effect transistor (MOSFET) and a bipolar junction (BJT) transistor. The voltage power source may be an alternating current (AC) source.

Figure 19:
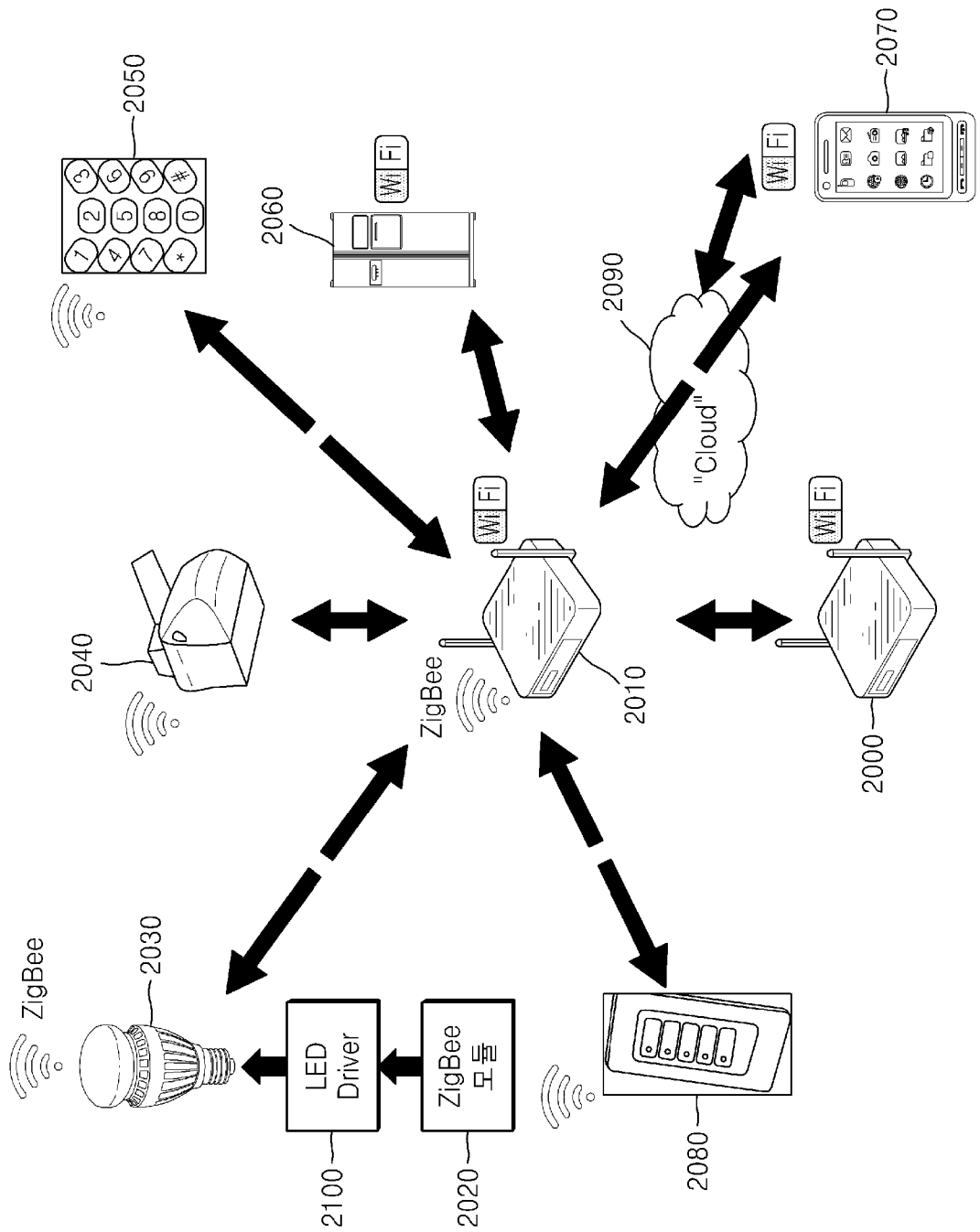
FIGS. 19 and 20 are exemplary views of a home network in which a lighting system that uses an optical sensor LED driver is applied, according to an exemplary embodiment.
Figure 20:
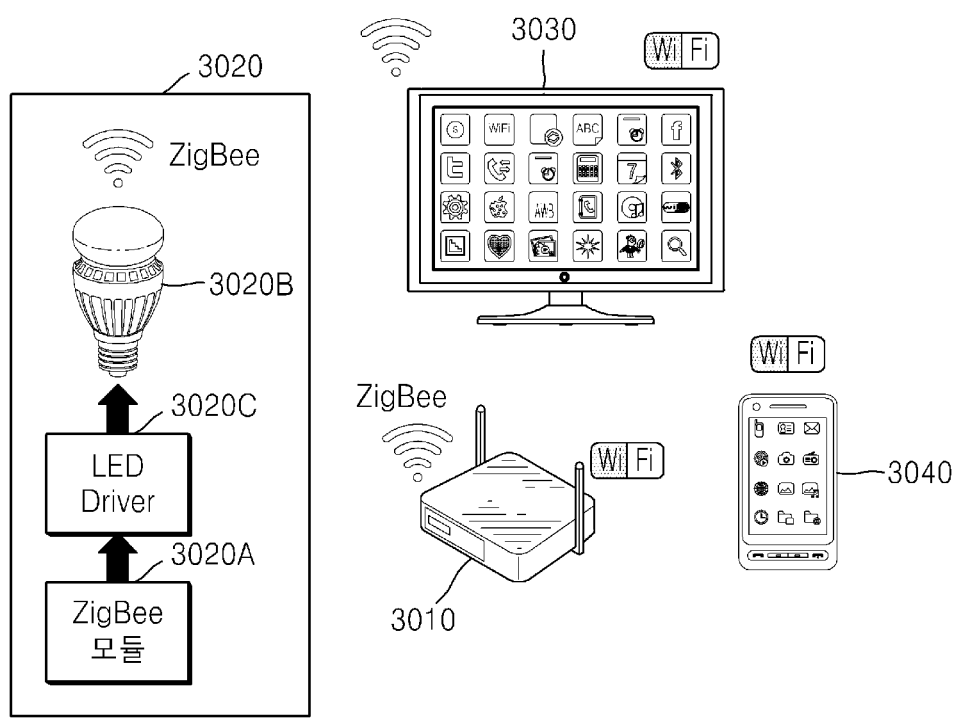

FIGS. 19 and 20 are exemplary views of a home network in which a lighting system that uses an optical sensor LED driver is applied, according to an exemplary embodiment.

As illustrated in FIG. 19, the home network may include a home wireless router 2000, a gateway hub 2010, a ZigBee module 2020, an LED lamp 2030, a garage door lock 2040, a wireless door lock 2050, a home application 2060, a cellular phone 2070, a switch 2080 mounted on a wall, a cloud network 2090, and an LED driver 2100.

Via a home wireless network (ZigBee, WiFi, etc.), brightness of the LED lamp 2030 may be automatically adjusted by using the above-described LED driver according to an exemplary embodiment depending on an operation status of home appliances and environments such as a bedroom, a living room, a garage, etc.

For example, as illustrated in FIG. 20, according to a type of a program being broadcast on a TV 3030 or brightness of a screen of the TV 3030, an LED driver 3020C may automatically adjust brightness of an LED lamp 3020B by communicating with a gateway 3010 and a ZigBee module 3020A. For example, when a TV drama is broadcast and thus a warm atmosphere is desired, a lighting device may be adjusted such that a color temperature is 12,000K or less. As another example, when a comedy program is broadcast and thus a casual atmosphere is desired, the lighting device may be adjusted such that the color temperature is higher than 12,000K and may emit bluish white light.

The ZigBee modules 2020 and 3020A may be integrally formed with an LED apparatus 3020.

Visible light communication is a technology that wirelessly transfers information by using light in the visible spectrum that may be detected by the human eye. The visible light communication is different from wired optical communication and infrared wireless communication in that light in the visible spectrum is used. Also, the visible light communication is different from the wired optical communication in that communication occurs in a wireless environment. In addition, the visible light communication is convenient in that it is free to use without restrictions or authorizations of frequency, provides excellent physical security, and the user may identify communication links by the user's eyes. Furthermore, the visible light communication is a convergence technology that may achieve unique purposes of a light source and communication functions.

An LED lighting apparatus may be used as interior and exterior light sources of vehicles. When used as an interior light source, the LED lighting apparatus may be used as an interior light, a reading light, a light source for the dashboard, and the like. When used as an exterior light source, the LED lighting apparatus may be used as a headlight, a break warning light, a directional signal light, a fog light, a daytime running light, and the like.

An LED using a particular wavelength range may promote growth of a plant, calm a person's feelings, cure diseases, etc. The LED may be applied as light sources for robots or other mechanical equipment. Since the LED relatively consumes less power and has a relatively long lifespan, the LED may be used in new renewable energy systems that provide energy from eco-friendly resources such as sunlight and wind.

It is understood that one or more of any of the above-described units and components may be implemented using hardware such as circuitry, memory, a processing device, etc.

A method according to another exemplary embodiment controls current provided to an LED array such that the current is maintained constant. In particular, the method includes comparing a sensing signal, which corresponds to a magnitude of an LED current flowing through the LED array, and a reference signal; obtaining a first output signal based on the comparing; and modifying the obtained first output signal to obtain a second output signal for controlling a dimming of the plurality of LEDs such that the LED current is maintained at a constant level. The method may further include outputting a controlled LED current that is maintained at a constant level according to a level of the obtained second output signal. Furthermore, the method may include generating a PWM signal based on the obtained second output signal; and outputting a controlled LED current according to a duty ratio of the PWM signal.

While exemplary embodiments have been particularly shown and described above, it will be understood that various changes in form and details may be made therein without departing from the spirit and scope of the following claims.

What is claimed is:

1. A light-emitting diode (LED) driver comprising:
   an LED current controller configured to control an LED current, which flows through an LED array comprising a plurality of LEDs, such that the LED current is maintained at a constant level;
   a comparer configured to compare a sensing signal, which corresponds to a magnitude of the LED current, and a reference signal, and to generate a first output signal based on a result of the comparison; and a dimming controller configured to modify the first output signal to obtain a second output signal for controlling a dimming of the plurality of LEDs, and to provide the second output signal to the LED current controller, wherein the dimming controller comprises a voltage level limiter that is connected to the comparer and is configured to limit a voltage level of the generated first output signal and the compares is configured to output the second output signal, the outputted second output signal corresponding to the first output signal limited by the voltage level limiter.

2. The LED driver of claim 1, wherein the LED current controller comprises:
a converter configured to output a controlled LED current and comprising a switch; and
a converter controller configured to control an operation of the switch according to a level of the provided second output signal.

3. The LED driver of claim 1, wherein the LED current controller comprises:
a pulse width modulation (PWM) signal generator configured to generate a PWM signal based on the provided second output signal;
a converter configured to output a controlled LED current and comprising a switch; and
a converter controller configured to control an operation of the switch according to a duty ratio of the PWM signal.

4. The LED driver of claim 1, further comprising an isolated component configured to transfer a control signal that is output from the dimming controller to the LED current controller.

5. The LED driver of claim 1, wherein:
the comparer comprises an operational amplifier comprising an inverting input terminal configured to receive the sensing signal and a non-inverting input terminal configured to receive the reference signal; and
the operational amplifier amplifies a difference between the received sensing signal and the received reference signal and outputs the amplified difference as the first output signal.

6. The LED driver of claim 5, wherein the voltage level limiter is connected to a power supply terminal of the operational amplifier, and is configured to provide a variable power source to the operational amplifier.

7. The LED driver of claim 5, wherein:
the voltage level limiter comprises a first resistor unit in which at least two first resistors are connected in parallel, and a second resistor unit in which at least two second resistors are connected in parallel;
a first voltage power source is connected to at least one of the first resistor unit and the second resistor unit; and
the voltage level limiter is configured to generate a second voltage from a first voltage provided by the first voltage power source based on a ratio between a total resistance of the first resistor unit and a total resistance of the second resistor unit, and to provide the second voltage as a supply voltage to the operational amplifier.

8. The LED driver of claim 7, wherein:
the voltage level limiter further comprises at least one switch in at least one of the first resistor unit and the second resistor unit so as to change the ratio between the total resistance of the first resistor unit and the total resistance of the second resistor unit; and
the dimming controller further comprises a switch controller configured to turn on/off the at least one switch.

9. A light-emitting diode (LED) driver comprising:
an LED current controller configured to control an LED current, which flows through an LED array comprising a plurality of LEDs, such that the LED current is maintained at a constant level;
a comparer configured to compare a sensing signal, which corresponds to a magnitude of the LED current, and a reference signal, and to generate a first output signal based on a result of the comparison; and
a dimming controller configured to modify the first output signal to obtain a second output signal for controlling a dimming of the plurality of LEDs, and to provide the second output signal to the LED current controller,
wherein:
the dimming controller comprises a voltage divider that is connected to an output terminal of the comparer; and
the voltage divider is configured to divide the first output signal to thereby obtaining the second output signal.

10. The LED driver of claim 9, wherein:
the voltage divider comprises a first resistor unit in which at least two first resistors are connected in parallel, and a second resistor unit in which at least two resistors are connected in parallel; and
the dimming controller further comprises a voltage limiter configured to obtain the second output signal from the first output signal based on a ratio between a total resistance of the first resistor unit and a total resistance of the second resistor unit, and to provide the obtained second output signal to the LED current controller.

11. The LED driver of claim 10, wherein:
the voltage divider further comprises at least one switch in at least one of the first resistor unit and the second resistor unit so as to change the ratio between the total resistance of the first resistor unit and the total resistance of the second resistor unit; and
the dimming controller further comprises a switch controller configured to turn on/off the at least one switch.

12. A light-emitting diode (LED) dimming apparatus comprising:
an LED array comprising a plurality of LEDs;
an LED current controller configured to control an LED current, which flows through the LED array, such that the LED current is maintained at a constant level;
a comparer configured to compare a sensing signal, which corresponds to a magnitude of the LED current, and a reference signal, and to obtain a first output signal based on a result of the comparison; and
a dimming controller configured to modify the first output signal to obtain a second output signal for controlling a dimming of the plurality of LEDs, and to provide the second output signal to the LED current controller,
wherein:
the dimming controller comprises a voltage divider that is connected to an output terminal of the comparer; and
the voltage divider is configured to divide the first output signal to obtain the second output signal.

13. The LED dimming apparatus of claim 12, wherein:
the dimming controller comprises a voltage level limiter that is connected to the comparer and is configured to limit a voltage level of the first output signal; and
the comparer is configured to output the second output signal, the outputted second output signal corresponding to the first output signal limited by the voltage level limiter.

14. A method of controlling current provided to an LED array comprising a plurality of LEDs, the method comprising:

comparing a sensing signal, which corresponds to a magnitude of an LED current flowing through the LED array, and a reference signal;
obtaining a first output signal based on the comparing; and
modifying the obtained first output signal to obtain a second output signal for controlling a dimming of the plurality of LEDs such that the LED current is maintained at a constant level,
wherein the modifying the obtained first output signal comprises dividing the first output signal to thereby obtain the second output signal.

15. The method of claim 14, further comprising outputting a controlled LED current that is maintained at a constant level according to a level of the obtained second output signal.

16. The method of claim 14, further comprising:
generating a PWM signal based on the obtained second output signal; and
outputting a controlled LED current according to a duty ratio of the PWM signal.

17. The method of claim 14, wherein the modifying the obtained first output signal comprises:
limiting a voltage level of the generated first output signal; and
outputting, by the comparer, the second output signal, the outputted second output signal corresponding to the first output signal limited by the limiting the voltage level of the generated first output signal.

* * * * *